(12) United States Patent
Takasaki et al.

(10) Patent No.: US 7,676,036 B2
(45) Date of Patent: Mar. 9, 2010

(54) INPUT DEVICE AND PERSONAL MOBILE TERMINAL HAVING THE SAME

(75) Inventors: Shinichi Takasaki, Osaka (JP); Shigeyuki Inoue, Kyoto (JP); Takako Shiraishi, Nara (JP)

(73) Assignee: Panasonic Corporation, Osaka (JP)

( * ) Notice: Subject to any disclaimer, the term of this patent is extended or adjusted under 35 U.S.C. 154(b) by 397 days.

(21) Appl. No.: 11/663,535

(22) PCT Filed: Aug. 2, 2005

(86) PCT No.: PCT/JP2005/014074

§ 371 (c)(1),
(2), (4) Date: Mar. 22, 2007

(87) PCT Pub. No.: WO2006/038369

PCT Pub. Date: Apr. 13, 2006

(65) Prior Publication Data

US 2008/0094257 A1   Apr. 24, 2008

(30) Foreign Application Priority Data

Sep. 30, 2004   (JP) .............................. 2004-288639

(51) Int. Cl.
  *H04M 1/00*   (2006.01)
  *H04M 9/00*   (2006.01)
(52) U.S. Cl. ............................ 379/433.07; 379/433.01

(58) Field of Classification Search ............ 379/433.01, 379/433.06, 433.07; 455/90.3, 575.1; 345/169, 345/170
See application file for complete search history.

(56) References Cited

U.S. PATENT DOCUMENTS

2003/0044000 A1   3/2003   Kfoury et al.

FOREIGN PATENT DOCUMENTS

| CN | 2520078 Y | 11/2002 |
|---|---|---|
| JP | 55-087224 | 7/1980 |
| JP | 10-207593 | 8/1998 |
| JP | 10-243075 | 9/1998 |
| JP | 2001-217904 | 8/2001 |
| JP | 2001-296953 | 10/2001 |
| JP | 2002-164980 | 6/2002 |
| JP | 2005-502276 | 1/2005 |
| WO | 03/021919 | 3/2003 |

*Primary Examiner*—Tuan D Nguyen
(74) *Attorney, Agent, or Firm*—Wenderoth, Lind & Ponack, L.L.P.

(57) ABSTRACT

An input device provided for an apparatus (1) which is held with a hand of a person. The input device includes a plurality of input keys (5) which are operated with a finger holding the apparatus (1), wherein in a case where the apparatus (1) having the input device is held with the hand, each input key (5) situated apart from a base of the finger has a finger contact area smaller than that of each input key (5) situated close to the base of the finger.

10 Claims, 16 Drawing Sheets

INPUT DEVICE AND PERSONAL MOBILE TERMINAL HAVING THE SAME

BACKGROUND OF THE INVENTION

1. Technical Field

The present invention relates to an input device and to a personal mobile terminal having the same.

2. Description of Related Art

FIG. 13 is a front view of a personal mobile terminal having a conventional input device.

As shown in FIG. 13, a conventional personal mobile terminal 100 is a so-called mobile phone, and is integrally composed of an operation unit 101 as an input device for inputting a telephone number and the like. In addition to this, the personal mobile terminal device 100 is composed of: a display unit 102 for displaying various kinds of information; and a speaker 103 and a microphone 104 used for a telephone conversation.

The operation unit 101 of the personal mobile terminal 100 includes input keys, function keys, selection keys, and an enter key.

The input keys include twelve kinds of keys which are: ten numeric keys on which numeric characters 0 to 9 are respectively labeled; and two auxiliary keys on which * and # are respectively labeled.

The function keys are used for calling functions, such as "clear", "memo", and "manner mode".

The enter key is used for having a next process performed on the basis of information inputted from the input device.

When an operator of the personal mobile terminal 100 operates the personal mobile terminal 100 with a hand, the operator typically holds the personal mobile terminal 100 in one hand and operates the input device with the thumb of the hand holding the personal mobile terminal 100. To be more specific, the operator uses the thumb of the hand holding the personal mobile terminal 100 to operate the input keys, the function keys, the selection keys, and the enter key.

FIG. 14 is a diagram for explaining a load put on the thumb during operation of the personal mobile terminal 100 having the conventional input device.

The keys provided for the conventional personal mobile terminal 100 are not arranged in consideration of a region which allows for easy movement of the finger that is used for operation. More specifically, all the keys including the numeric keys provided for the input device are the same in size and are just arranged in a matrix in an orderly manner.

When the numeric keys of the personal mobile terminal 100 as described above are operated with the thumb, a load on the thumb is relatively light when operating the keys in a region A apart from the base of the thumb whereas a heavy load is put on the thumb when operating the keys in a region B close to the base of the thumb. On account of this, the more the number of key operations, the heavier the load put on the hand and the finger used for operation. This load is considered as a possible cause of mental and physical fatigue. In addition, in the case where the fatigue has built up on the hand and the finger, the personal mobile terminal may be dropped and damaged, such as when the operator tries to get a better grip on the personal mobile terminal.

This problem has remarkably arisen as the number of key operations has been increased along with multi-functionality of personal mobile terminals of recent years. Especially in terms of character input operations such as an email creation, an increase in the number of characters allowed in an email transmission significantly increases the number of key operations. For this reason, it is highly possible to cause mental and physical fatigue, and this problem thus should be solved as soon as possible.

In order to solve this problem, terminals with easy operability that reduce the load on the hand and the finger used for operation have been suggested (see JP2002-164980 and JP 2001-296953, for example).

FIG. 15 is a diagram showing a conventional personal mobile terminal described in mentioned above.

As shown in FIG. 15, a plurality of keys 18 are arranged along circumferences of circles having the same center which is described as a predetermined point O. Consider a case where a body 11 is held with a palm of one hand and fingers other than a thumb of this hand, and key operations are performed using only the thumb of the hand. By aligning the predetermined point O with the center of the joint at the base of the thumb, the keys 18 come to be situated along paths of rotational movements made by the thumb with the joint being the center. This key arrangement allows for an improvement in the operability of key inputs performed for inputting characters or symbols.

FIG. 16 is a diagram showing a personal mobile terminal having a conventional input device described in mentioned above.

As shown in FIG. 16, a button key unit 600 and a jog dial unit 700 are structured separately so as to each rotate freely on a center of a circle as its axis of rotation. The separate rotations of the button key unit 600 and the jog dial unit 700 substantially increase the amount of information allowed to be inputted. In addition to this, a reduction in a surface area occupied by the button key unit 600 and the jog dial unit 700 decreases the amount of movements made by a finger of the operator since an input operation can be performed in this small area. Thus, the operator is able to perform an efficient operation.

Patent Reference 1: Japanese Laid-open Patent Application No. 2002-164980

Patent Reference 2: Japanese Laid-open Patent Application No. 2001-296953

SUMMARY OF THE INVENTION

1. Problems to be Solved

However, in the case where the personal mobile terminal described in above-mentioned JP 2002-164980 is held with one hand and an input operation is performed with the thumb of this hand as shown in FIG. 14, the load on the thumb is relatively light when the operation is performed with the thumb stretched out. Meanwhile, the load is heavy when the operation is performed with the thumb flexed. Yet, the keys are not arranged in consideration of the load on the thumb that is caused when the operation is performed with the thumb flexed. Such a key arrangement not only puts the load on the hand and the thumb, but is a contributing factor to deterioration in accuracy of operation as well.

Moreover, when a positional relation between the hand that is used for operation and the predetermined point that is a reference point for the key arrangement is changed during operation, such as when the operator tries to get a better grip on the personal mobile terminal with one hand, the paths of rotational movements of the thumb do not coincide with the key arrangement. This not only puts the load on the hand and the thumb holding the terminal, but is a contributing factor to deterioration in accuracy of operation as well.

Furthermore, in the case of the personal mobile terminal of above-mentioned JP 2002-164980, the key arrangement can be changed automatically as needed or by a predetermined input operation. Even so, the positional relation with the predetermined point still should be maintained during operation. If the key arrangement is changed during operation, it would be difficult to know positional changes of the keys from the previous key arrangement. As a result, an operational error may be caused.

On the other hand, in the case of the personal mobile terminal described in above-mentioned JP 2001-296953, the placement of the button key unit 600 and the jog dial unit 700 in the small area can reduce the amount of movements of the operating finger. However, an input operation is performed by rotating the button keys and the jog dial, so that relative positions of the button keys with respect to the personal mobile terminal are changed every time an input operation is performed. For this reason, the operator has to input information, looking for desired button keys arranged on the input device each time. This may turn out to put the load on the operator due to, for example, degradation in input speed.

The stated problem has occurred not only to a personal mobile terminal, but also to a device, such as a PDA and a remote control, which is held with one hand and operated with this hand to perform an input operation.

The present invention was conceived in view of the stated problem, and has an object of providing an input device that increases the operability and offers comfortable operation by reducing, in the case where the device is held with one hand and the operation is performed with the thumb of the hand, a load on the hand and the finger used for operation.

2. Means to Solve the Problems

In order to achieve the stated object, an input device of the present invention is provided for an apparatus which is held with a hand of a person, the input device being composed of a plurality of input keys which are operated with a finger holding the apparatus, wherein in a case where the apparatus having the input device is held with the hand, each of the input keys situated apart from a base of the finger has a finger contact area smaller than that of each of the input keys situated close to the base of the finger.

With this structure, the size of each input key situated in a region, where the load on the finger of the operator is heavy when the operator performs an input operation, is increased whereas the size of each input key situated in a region, where the load on the finger of the operator is light, is reduced. Accordingly, when operating the input keys situated in the region where the load is heavy, the operator can operate desired keys without concern (or, one could say "with carefree") for positional accuracy of the finger used for operating the input keys. When operating the input keys situated in the region where the load is light, the operator can operate desired keys, easily maintaining the positional accuracy of the finger used for operating the input keys. In this way, it is possible to provide a structure of the input device that allows the operator to easily perform the input operation.

It is preferable that the finger is a thumb.

With this structure, the device having the input device can be firmly held with one hand from the back of the device, and the input operation can be performed with the thumb of this hand. Moreover, the size of each input key situated in the region, where the load on the hand or the finger used for operation is relatively heavy, may be larger than the size of each input key situated in the region, where the load is light. Thus, the input keys in the smaller size can be arranged more in the region where the load on the hand or the thumb used for operation is light whereas the input keys in the larger size can be arranged less in the region where the load is heavy. In this way, the load on the hand and the thumb used for operation can be reduced, thereby allowing for comfortable operation.

The input keys may include a plurality of circumferential input keys arranged around a circumference having a center on the input device.

With this structure, for the case where the device having the input device is held with one hand and the input operation is performed with the thumb of this hand, the circumferential input keys used for inputting characters and symbols are arranged in the circumferential direction so that paths of rotational movements of the finger coincide with the key arrangement and that a positional relation between the keys and the finger is not changed. Moreover, each of the circumferential input keys situated in the region, where the load on the hand and the finger used for operation is relatively heavy, is larger in size than each of the circumferential input keys situated in the region where the load is relatively light. In this way, the load on the hand and the thumb used for operation can be reduced, thereby allowing for comfortable operation.

Moreover, a set of the circumferential input keys may be operable to: rotate as a whole about the center of the circumference, as an axis of rotation, around which the circumferential input keys are arranged; and stop at a predetermined angle.

With this structure, the same operability can be provided for both the left-handed and right-handed operations. For example, consider a case where the circumferential input keys are arranged so as to not put the load on the thumb when the input device is held with the right hand and an input operation is performed with the thumb of the right hand. In this case, if the input device is shifted from the right hand to the left hand, the same operability can be maintained by rotating the circumferential input keys by 180 degrees. In this way, for the one-handed operation using either hand, the load on the hand and the thumb used for operation can be reduced, thereby allowing for comfortable operation.

It should be noted that a circle referred to in this specification of the present invention includes not only a geometric perfect circle, but an oval figure and an oblong figure as well.

Also note that a character input key referred to in the specification of the present invention is not necessarily used only for inputting a character or a symbol. This input key is mainly used for inputting the character or the symbol, and may also have an additional function (of calling a function of the device, for example) aside from inputting the character or the symbol.

Similarly, an input enter key and a direction key referred to in the specification of the present invention are not necessarily used respectively only for entering inputs from the input keys and selecting a direction. These keys may also have additional functions.

EFFECTS OF THE INVENTION

The input device of the present invention increases the operability and allows for comfortable operation, by reducing the load on the hand and the finger used for operation.

Figure 1:
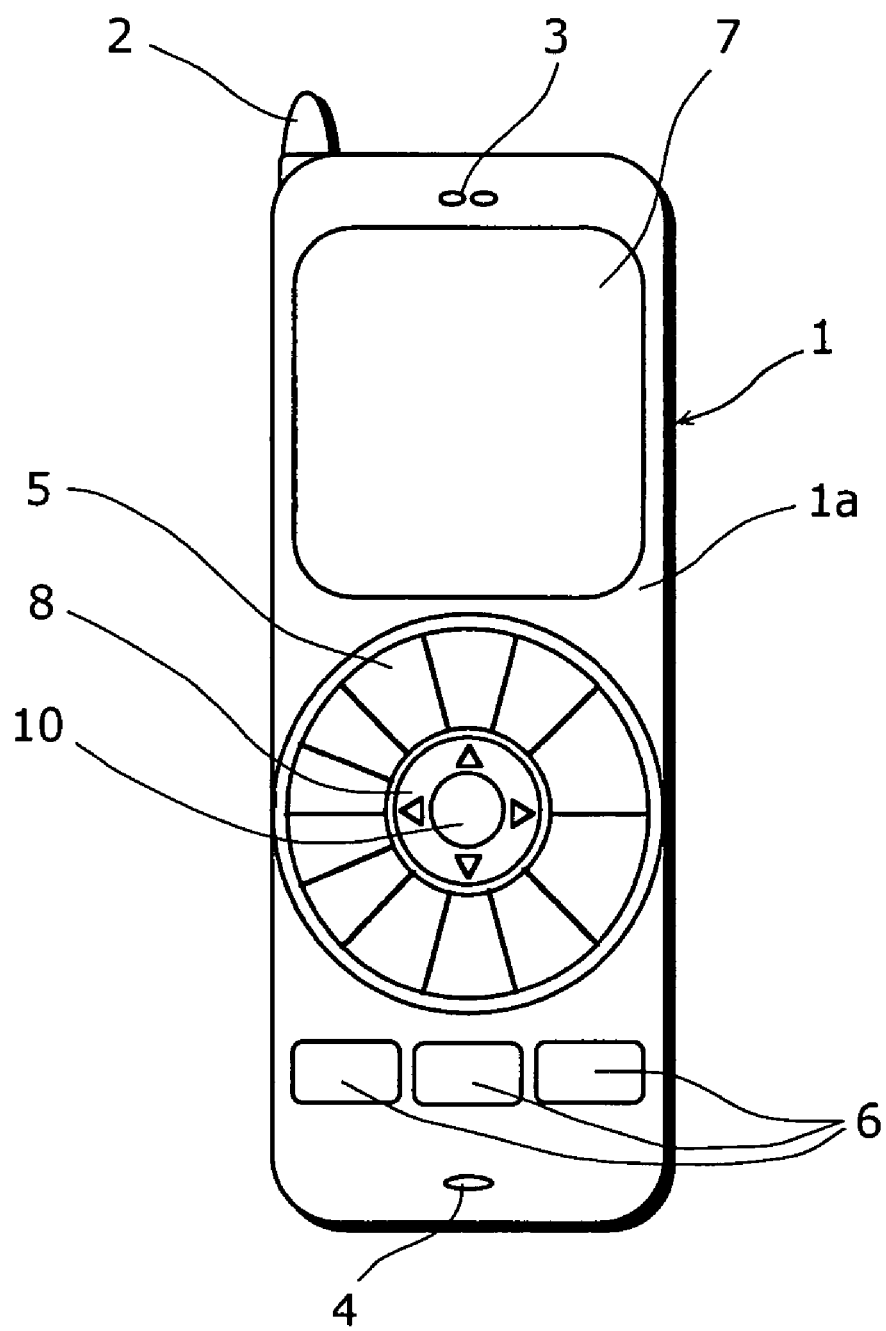
FIG. 1 is a front view of a personal mobile terminal having an input device according to a first embodiment of the present invention.

REFERENCE NUMERALS 1, 20, 30, 40, 50 personal mobile terminal
1a front of personal mobile terminal
2 antenna
3 speaker
4 audio input unit
5 character input key
6 function call key
7 display unit
8 direction key
10 input enter key
25, 35, 55 circumferential input key
45 software input key
60 light-emitting diode
61 indentation
62 protrusion
63 spring
64 stopper
65 switch mechanism
100 conventional personal mobile terminal
101 operation unit of conventional mobile terminal
102 display unit of conventional mobile terminal
103 speaker of conventional mobile terminal
104 microphone of conventional mobile terminal
11 body of personal mobile terminal of Patent Reference 1
18 key of personal mobile terminal of Patent Reference 1
600 button key unit of mobile input operation unit of Patent
700 jog dial unit of mobile input operation unit of Patent

DETAILED DESCRIPTION OF THE INVENTION

The following is a description of preferred embodiments of the present invention, with reference to the drawings. It should be noted here that the same numeral is assigned to the identical elements in the drawings.

First Embodiment

The first embodiment is explained with reference to FIGS. 1, 2, 3, 4, and 5.

FIG. 1 is a front view of a personal mobile terminal 1 having an input device according to the first embodiment of the present invention.

The personal mobile terminal 1 is provided with functions for making a phone call, receiving/sending an email, and connecting to the Internet. These functions are not the prime features of the present invention, so will not be explained in the present specification.

An antenna 2 is set at an upper end of the personal mobile terminal 1. Moreover, on a front 1a of the personal mobile terminal, there are provided a speaker 3 for outputting audio, an audio input unit 4 for inputting audio, function call keys 6 for calling functions of the personal mobile terminal (such as an email function, a phone call function, a Web browsing function, and a manner mode setting function), and a display unit 7 for displaying various kinds of information.

The input device provided for the personal mobile terminal 1 has twelve character input keys 5 as circumferential input keys for inputting ten numerics 0 to 9 and two symbols.

Moreover, the input device has; a direction key 8 as a center key for selecting an appropriate character, symbol, or function from among a plurality of inputs received from the character input keys 5 and from the function call keys 6 for calling the functions of "clear", "memo", and "manner"; and an input enter key 10 for entering the character, symbol, or function selected using the direction key 8 from among the plurality of inputs received from the character input keys 5 and the function call keys 6.

Here, the character input keys 5 are so arranged around the same circumference as to surround the direction key 8 and the input enter key 10. The direction key 8 and the input enter key 10 are fixed, and do not rotate whereas a set of the character input keys 5 is able to rotate. It should be noted that the rotation range of the set of the character input keys 5 is limited to 180 degrees in consideration of each case where the personal mobile terminal is held with either the right or left hand.

It is preferable that the rotation range is limited to 180 degrees in this way so that a signal from the character input key 5 can be transmitted by flexible wiring without through the medium of a slidable contact.

Moreover, as shown in FIG. 1, the character input keys 5 situated on the right side respectively have finger contact areas larger than those of the character input keys 5 situated on the left side. Especially the character input keys 5 situated on the right side in the lateral direction are set to have the largest areas.

An effect in regard to the sizes of the surface areas is explained as follows, with reference to FIGS. 2 and 3.

Figure 2:
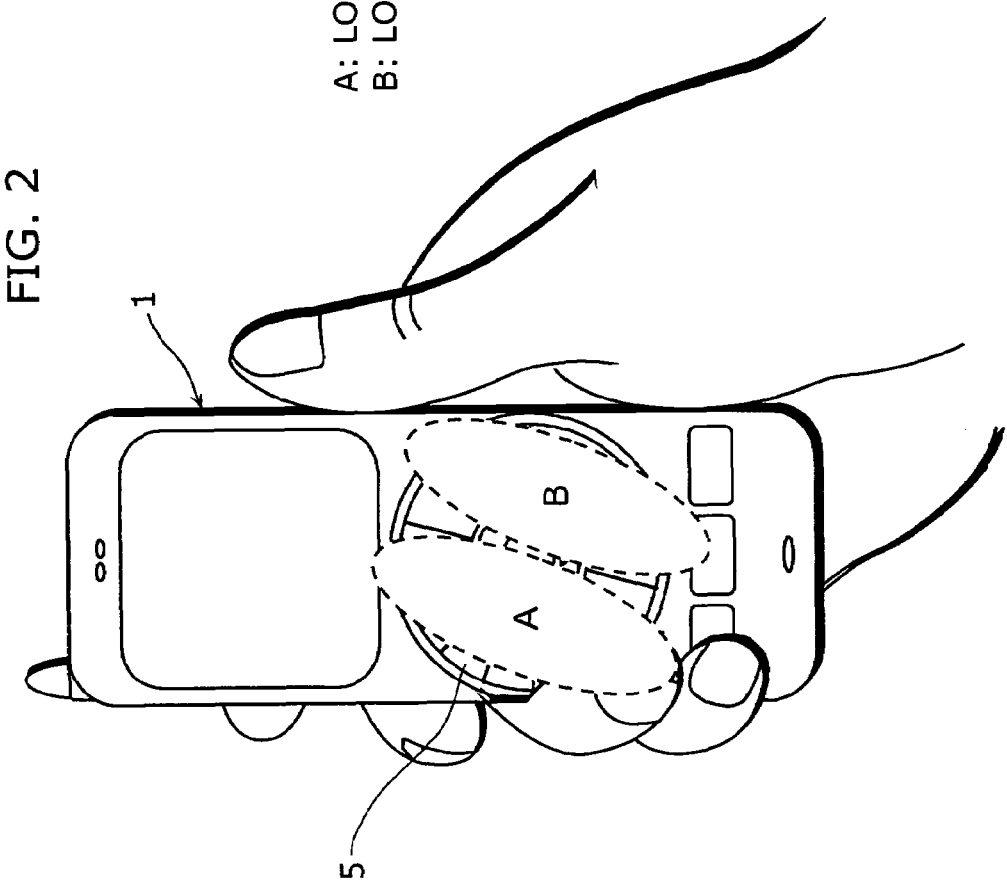
FIG. 2 is a diagram that shows respective regions where a load on a hand and a thumb during operation is heavy and light when the personal mobile terminal having the input device according to the first embodiment of the present invention is operated with the right hand of an operator.

FIG. 2 is a diagram that shows respective regions where a load on the hand and the thumb during operation is heavy and light when the personal mobile terminal having the input device according to the first embodiment of the present invention is operated with the right hand of the operator.

For operating the character input keys 5 situated in a region A shown in FIG. 2, the thumb is stretched out so the load on the hand and the thumb during the operation is light. On the other hand, for operating the character input keys 5 situated in a region B shown in FIG. 2, the thumb is flexed and is in a cramped position so the load on the thumb is heavy. In the case of a long-duration operation or a creation of an email that includes a great number of characters, for example, the thumb is to be stretched out and then flexed over and over again, resulting in an increase of the operational load.

Figure 3:
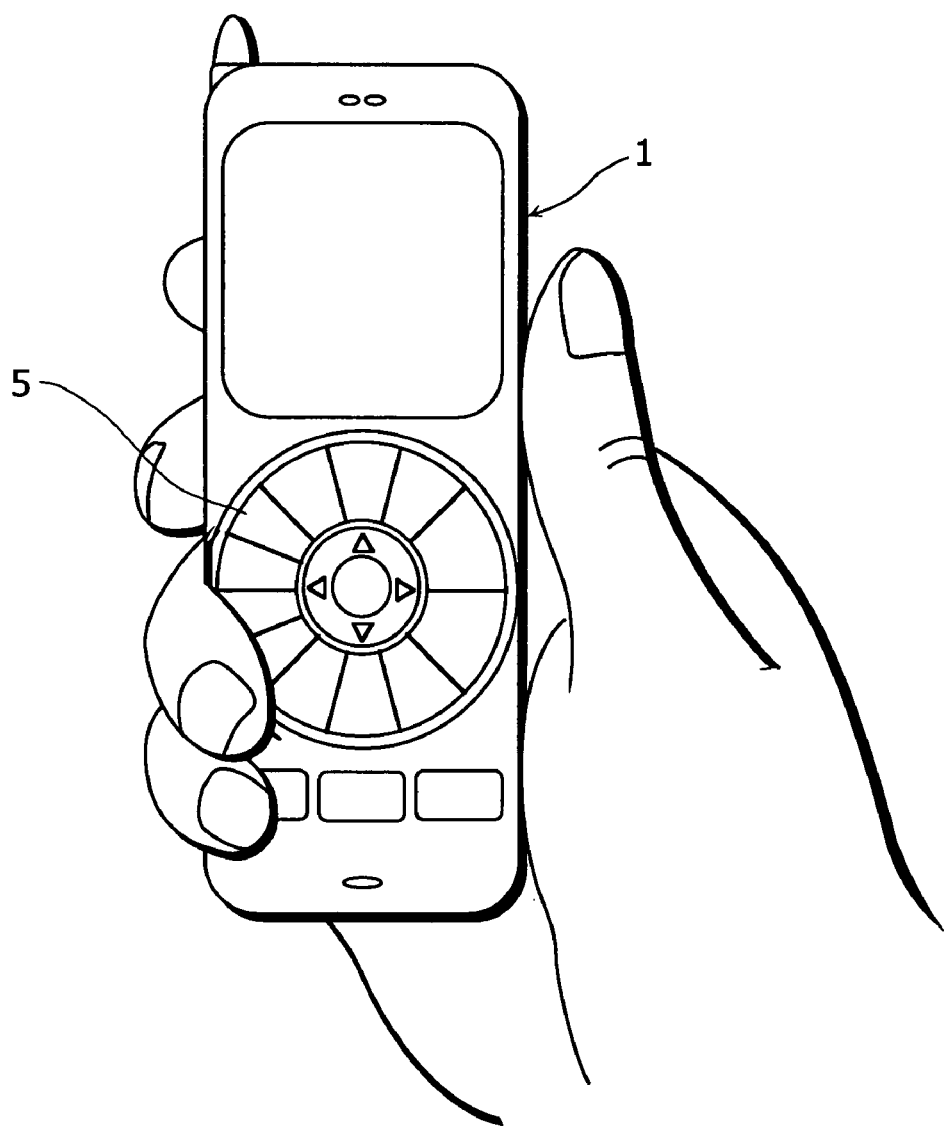
FIG. 3 is a diagram showing a case where the operator is operating the personal mobile terminal having the input device according to the first embodiment of the present invention with the right hand.

FIG. 3 is a diagram showing a case where the operator is operating the personal mobile terminal having the input device according to the first embodiment of the present invention with the right hand.

As shown in FIG. 3, the character input keys 5 situated in a region (the region B in FIG. 2) where the thumb needs to be flexed for operation respectively have finger contact areas larger than those of the character input keys 5 situated in a region (the region A in FIG. 2) where the thumb needs to be stretched out.

To be more specific, the keys having the smaller finger contact areas are arranged in the region where the load on the hand or the finger used for operation is light whereas the keys having the larger finger contact areas are arranged in the region where the load is heavy. Accordingly, the load on the hand and the thumb used for operation can be reduced, thereby allowing for comfortable operation.

Moreover, the character input keys 5 composed of the numeric keys and the symbol keys which are frequently used during the usage of the personal mobile terminal are so arranged on the same circumference as to surround the direction key 8 and the input enter key 10. Owing to this arrangement, the amount of movements made by the thumb in an operation flow including a character input, an input selection, and an input entry can be small. Therefore, the load on the hand and the thumb used for operation can be reduced and comfortable operation is also allowed.

Figure 4:
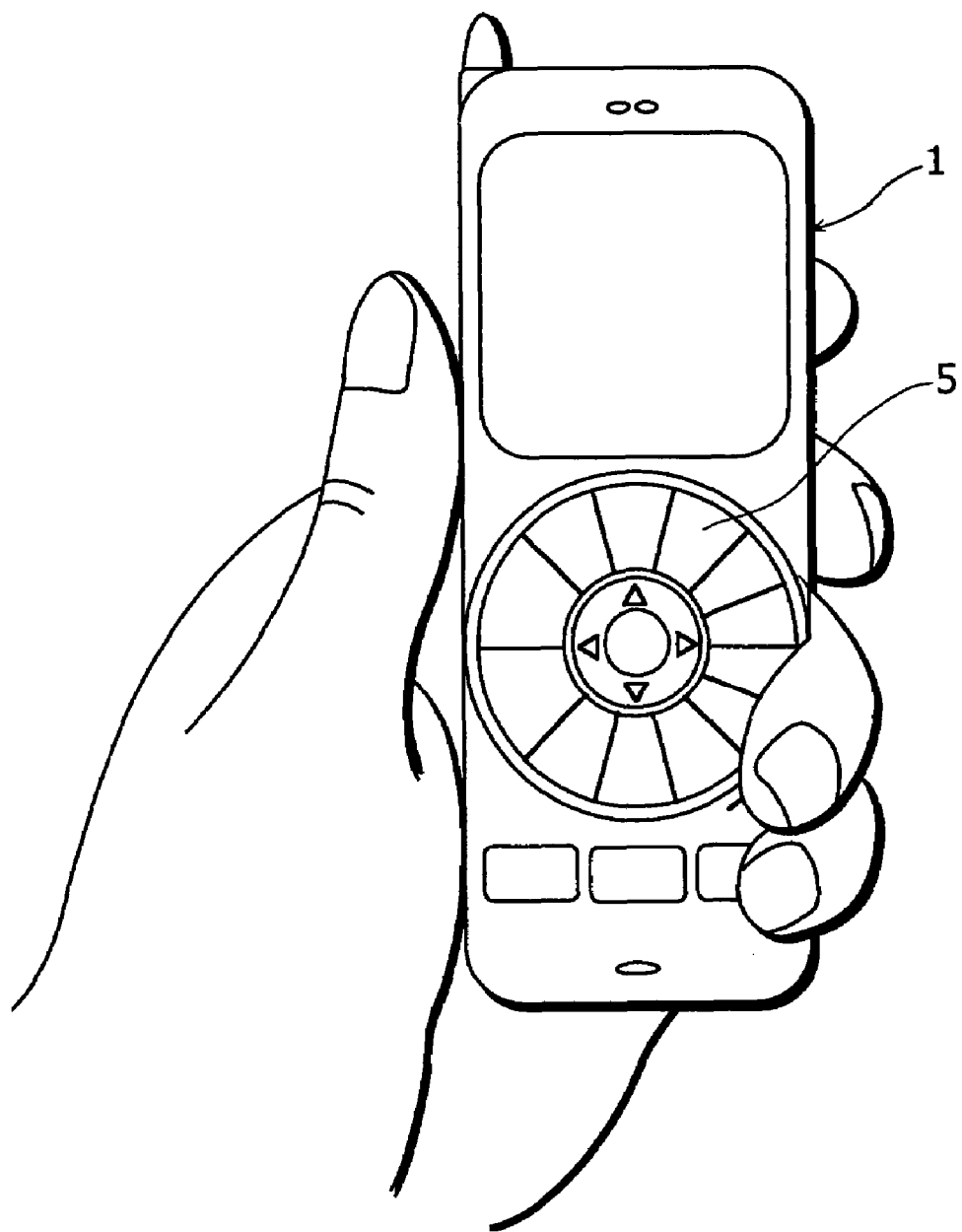
FIG. 4 is a diagram showing a case where the operator is operating the personal mobile terminal having the input device according to the first embodiment of the present invention with the left hand.

FIG. 4 is a diagram showing a case where the operator is operating the personal mobile terminal having the input device according to the first embodiment of the present invention with the left hand.

The personal mobile terminal according to the present embodiment has the set of the character input keys 5 which can be rotated by 180 degrees around the input enter key 10. Thus, when the operator is to hold the personal mobile terminal 1 with the left hand and perform the operation with the thumb of the left hand, the operator rotates the set of the character input keys 5 by 180 degrees from the state in which the operator holds the terminal with the right hand. With this rotation, when the personal mobile terminal 1 is held with the left hand, the same operational feeling as in the case where the personal mobile terminal is held with the right hand can be obtained. More specifically, the keys having the smaller finger contact areas are arranged in the region where the load on the hand or the thumb used for operation is light whereas the keys having the larger finger contact areas are arranged in the region where the load is heavy. Accordingly, the load on the hand and the thumb used for operation can be reduced, thereby allowing for comfortable operation.

In addition, the set of the character input keys 5 can be rotated as a whole using only the thumb. Thus, when the personal mobile terminal is shifted to the other hand, the effect described above can be easily obtained.

Figure 5A:
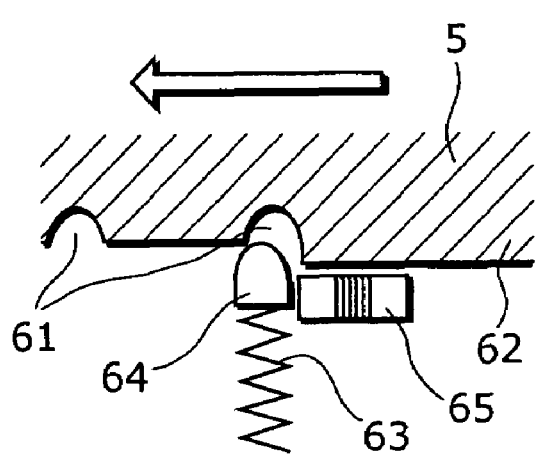
FIGS. 5A and 5B are schematic side views for explaining a mechanism of rotation/stopping of character input keys.
Figure 5B:
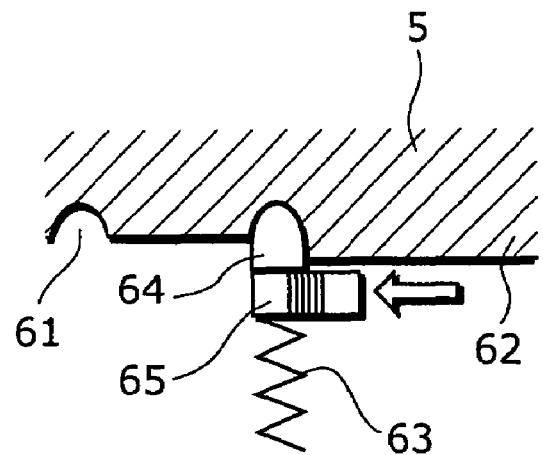

As shown in FIG. 5, on a marginal region of an outer circumference of the back of the character input keys 5, there are provided hemispherical indentations 61 evenly spaced apart within the range of 180 degrees. Moreover, a protrusion part 62 is provided in a region where there are no indentations 61. The protrusion part 62 protrudes more than a region where the indentations 61 are provided. Furthermore, a bullet-shaped stopper 64 is so attached to the body of the personal mobile terminal via a spring 63 as to be movable in and out with respect to the indentation 61. Additionally, a switch mechanism 65 is set near the stopper 64 as a rotation preventing means for controlling movement of the stopper 64 that fits into the indentation 61 and for preventing the stopper 64 from coming out of the indentation 61 in order to keep the set of the character input keys 5 from rotating.

In accordance with the rotation of the character input keys 5, engagement and disengagement between the indentations 61 evenly spaced apart and the stoppers 64 biased by the springs 63 are intermittently repeated so that the set of the character input keys is locked at every predetermined angle. Then, the switch mechanism 65 slides in the direction of the stopper 64 in the locked state, so that the rotation can be controlled to an arbitrary angle. Moreover, the protrusion part 62 allows the set of the character input keys 5 to rotate only within the range of 180 degrees.

The switch mechanism 65 allows the operator to arbitrarily choose between lock and release of the rotation of the character input keys 5. The operator decides on which hand to use before starting to use the personal mobile terminal, and locks the rotation at a desired position. After rotating the set of the character input keys 5 to a desired angle, the operator can fix this angle to the body of the personal mobile terminal by means of the switch mechanism. This accordingly prevents the set of the character input keys from rotating while the operator is performing an operation and also prevents an error input that may be caused due to an intentional change in the positional relation between the character input keys 5 and the body of the personal mobile terminal. It should be understood that a mechanism to control the rotation of the character input keys 5 is not limited to the switch mechanism described above and may be a different mechanism.

As explained so far, in the case of the personal mobile terminal 1 having the input device according to the first embodiment of the present invention, each size of the character input keys 5 arranged around the circumference of the direction key 8 and the input enter key 10 is set depending on the amount of load on the thumb, thereby reducing the load on the hand and the thumb used for operation. In addition, the set of the character input keys 5 can be rotated by 180 degrees, so that the same operating feeling can be obtained in both the right-handed and left-handed operations. This accordingly allows for comfortable operation.

Moreover, the twelve character input keys 5 which are most frequently used are arranged around the same circumference, allowing for character inputs with a high degree of efficiency.

According to the structure described above, each of the character input keys in the region causing the load during operation is enlarged in size whereas each of the character input keys in the region that is less likely to cause the load during operation is reduced in size. Thus, the entire size of the character input keys as a whole can be maintained virtually constant. For this reason, because some of the input keys are enlarged for the purpose of making it easier for the operator to perform an input operation does not mean that the size of the input device needs to be enlarged or that the number of the keys needs to be reduced. Accordingly, the downsized personal mobile terminal can still offer an easy-to-operate input device.

Second Embodiment

Figure 6:
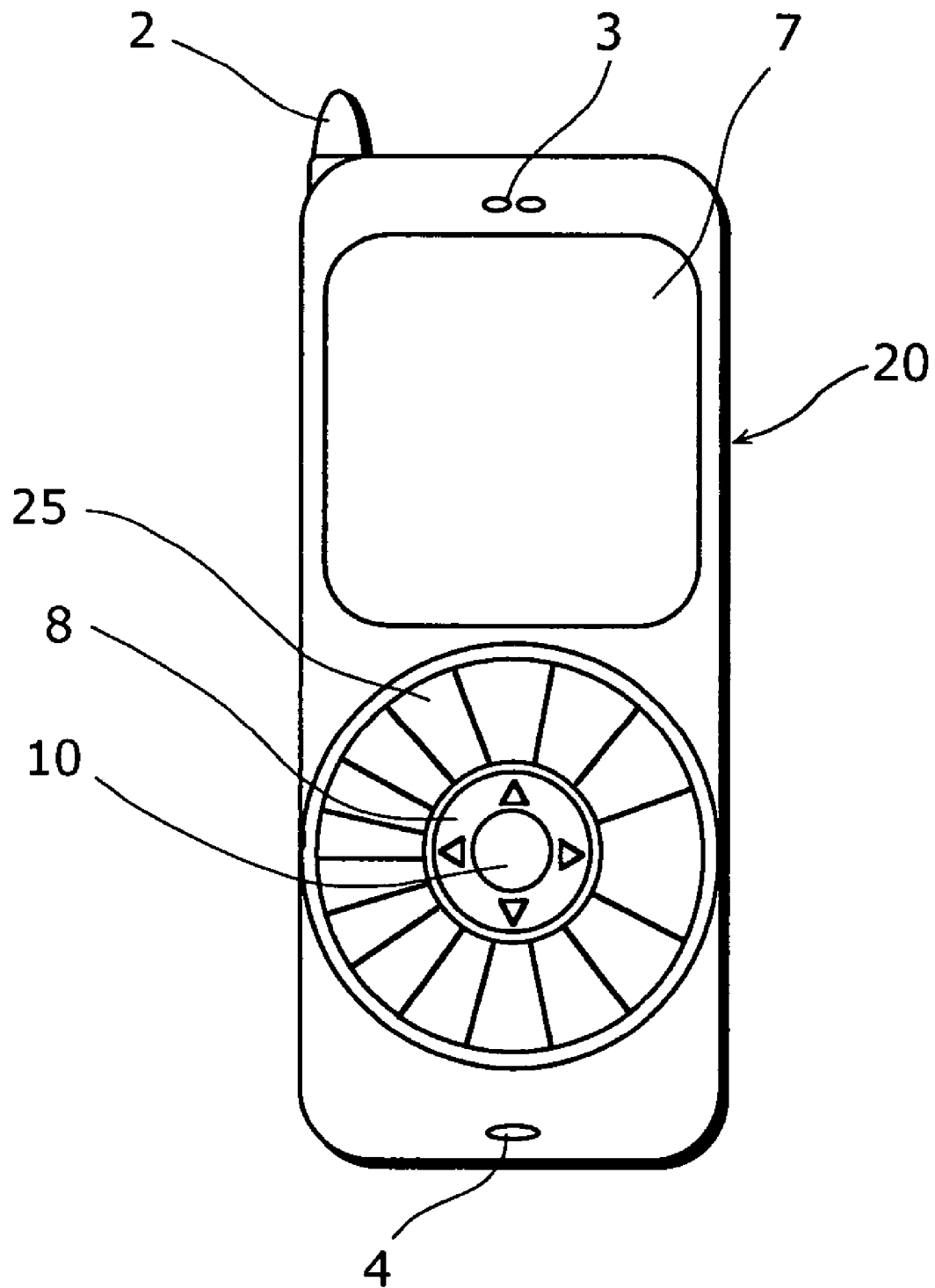
FIG. 6 is a front view of a personal mobile terminal having an input device according to a second embodiment of the present invention.

The second embodiment is explained, with reference to FIGS. 2 and 6.

It should be noted here that the components which are identical to those in the first embodiment are assigned the same reference numerals, and will not be explained.

FIG. 6 is a front view of a personal mobile terminal 20 having an input device according to the second embodiment of the present invention.

The input device of the personal mobile terminal 20 has circumferential input keys 25 including fifteen kinds of keys for inputting: ten kinds of numeric characters 0 to 9; two kinds of symbols; and three kinds of function keys (such as an outgoing call key, a manner mode key, and a clear key) which are frequently used during the usage of the personal mobile terminal.

The circumferential input keys 25 are so arranged around the same circumference as to surround the direction key 8 and the input enter key 10. The direction key 8 and the input enter key 10 are fixed and so do not rotate whereas the set of circumferential input keys 25 is able to rotate. It should be noted that the rotation range of the set of the circumferential input keys 25 is limited to 180 degrees in consideration of each case where the personal mobile terminal is held with either the right or left hand.

Moreover, as shown in FIG. 6, the circumferential input keys 25 situated on the right side respectively have finger contact areas that are larger than those of the circumferential input keys 25 situated on the left side. Especially the circumferential input keys 25 situated on the right side in the lateral direction are set to have the largest surface areas.

The personal mobile terminal 20 having the input device according to the second embodiment of the present invention is composed of the circumferential input keys 25 which are arranged around the circumference of the direction key 8 and the input enter key 10 and which, as a whole, can rotate by 180 degrees. In view of this, the circumferential input keys 25 can be arranged so that the keys situated in a region where the thumb needs to be flexed when the personal mobile terminal 20 is held by the operator for operation have finger contact areas larger than those of the keys situated in a region where the thumb needs to be stretched out. To be more specific, the keys having the smaller finger contact areas are arranged in the region where the load on the hand or the finger used for operation is light whereas the keys having the larger finger contact areas are arranged in the region where the load is heavy. Accordingly, the load on the hand and the thumb used for operation can be reduced, thereby allowing for comfortable operation.

Moreover, the character input keys for inputting characters, numerics, and symbols which are frequently used during the usage of the personal mobile terminal can be arranged mainly in the region A shown in FIG. 2, that is a region where the thumb is stretched out for operation. Owing to such a key arrangement, in addition to the effect due to the circumferential input keys 25 being arranged around the same circumference surrounding the direction key 8 and the input enter key 10, the amount of movements made by the thumb in a flow of the character input operation can be small. Therefore, the load on the hand and the thumb used for operation can be reduced and comfortable operation is also allowed.

Furthermore, as is the case with the first embodiment, the set of the circumferential input keys 25 can be rotated by 180 degrees around the input enter key 10. Thus, when the operator is to hold the personal mobile terminal 20 with the left hand and perform the operation with the thumb of the left hand, the operator rotates the set of the character input keys 25 by 180 degrees from the state in which the operator holds the terminal with the right hand. With this rotation, when the personal mobile terminal 20 is held with the left hand, the same operational feeling as in the case where the personal mobile terminal 20 is held with the right hand can be obtained. More specifically, the keys having the smaller finger contact areas are arranged in the region where the load on the hand or the thumb used for operation is light whereas the keys having the larger finger contact areas are arranged in the region where the load is heavy. Accordingly, the load on the hand and the thumb used for operation can be reduced, thereby allowing for comfortable operation.

As explained so far, in the case of the input device according to the second embodiment of the present invention, each size of the circumferential input keys 25 arranged around the circumference of the direction key 8 and the input enter key 10 is set depending on the amount of load on the thumb, thereby reducing the load on the hand and the thumb used for operation. In addition, the set of the circumferential input keys 25 can be rotated by 180 degrees, so that the same operating feeling can be obtained in both the right-handed and left-handed operations. This accordingly allows for comfortable operation.

Additionally, since the circumferential input keys 25 are arranged around the same circumference, the amount of movements made by the thumb in a flow of the character input operation can be small. Therefore, the load on the hand and the thumb used for operation can be reduced and comfortable operation is also allowed.

Third Embodiment

Figure 7:
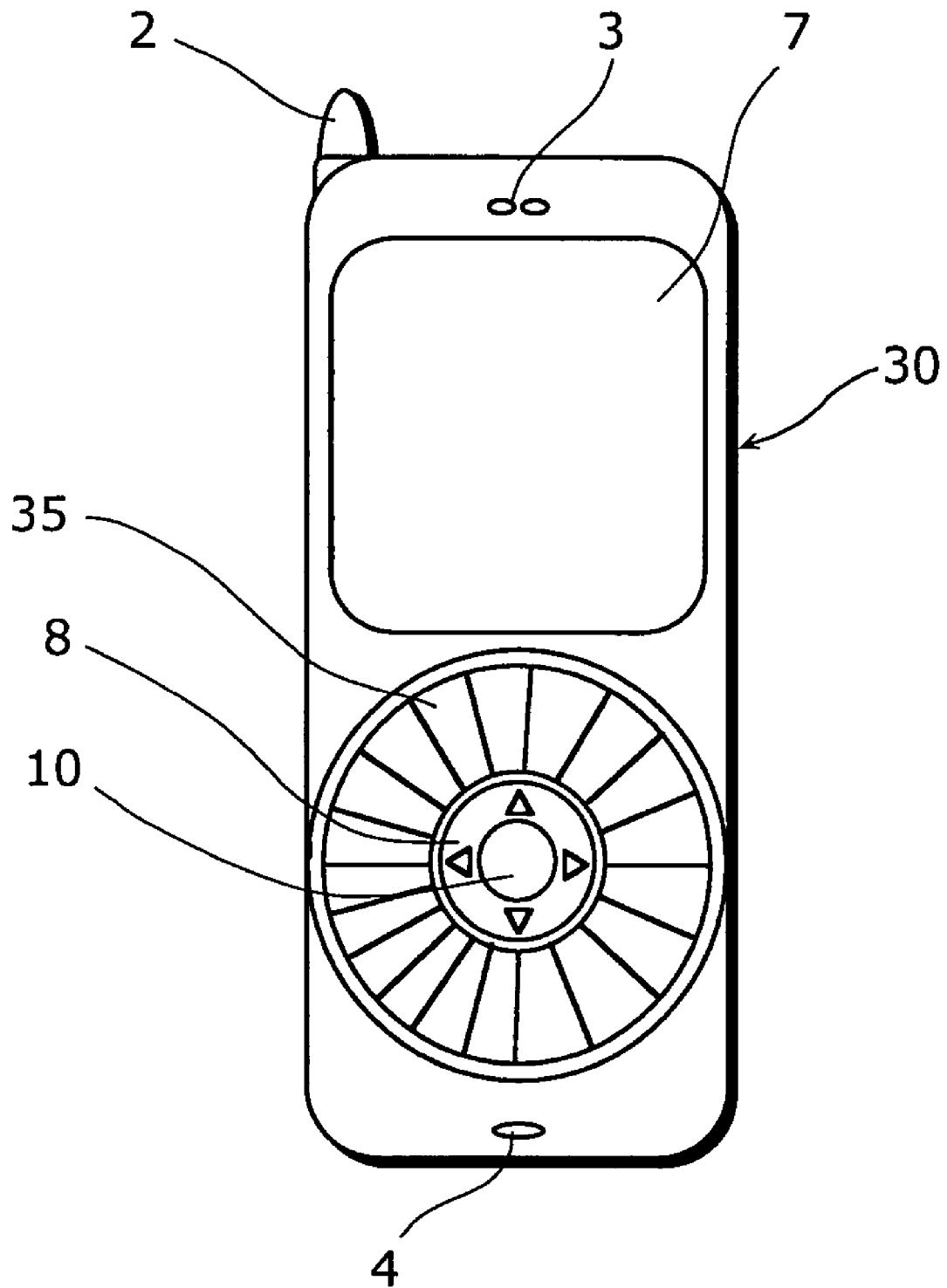
FIG. 7 is a front view of a personal mobile terminal having an input device according to a third embodiment of the present invention.

The third embodiment is explained using FIGS. 2 and 7, with an emphasis on differences from the first and second embodiments. It should be noted here that the components which are identical to those in the first and second embodiments are assigned the same reference numerals, and will not be explained.

FIG. 7 is an external view of a personal mobile terminal 30 having an input device according to the third embodiment of the present invention.

The input device of the personal mobile terminal 30 has circumferential input keys 35 including twenty kinds of keys for inputting: ten kinds of numeric characters 0 to 9; two kinds of symbols; and eight kinds of function keys (such as an outgoing call key, a manner mode key, and a clear key) which are frequently used during the usage of the personal mobile terminal. In other words, the circumferential input keys 35 are composed of almost all keys required during the usage of the present personal mobile terminal.

The circumferential input keys 35 are so arranged around the same circumference as to surround the direction key 8 and the input enter key 10. The direction key 8 and the input enter key 10 are fixed and so do not rotate whereas a set of the circumferential input keys 25 is able to rotate. It should be noted that the rotation range of the set of the circumferential input keys 35 is limited to 180 degrees in consideration of each case where the personal mobile terminal is held with either the right or left hand.

Moreover, as shown in FIG. 6, the circumferential input keys 35 situated on the right side respectively have finger contact areas larger than those of the circumferential input keys 35 situated on the left side. Especially the circumferential input keys 35 situated on the right side in the lateral direction are set to have the largest areas.

The personal mobile terminal 30 having the input device according to the third embodiment of the present invention is composed of the circumferential input keys 35 which include almost all the keys required during the usage of the personal mobile terminal. These keys are arranged around the circumference of the direction key 8 and the input enter key 10, and can be rotated as a whole by 180 degrees. In view of this, the circumferential input keys 35 can be arranged so that the keys situated in a region where the thumb needs to be flexed when the personal mobile terminal 30 is held by the operator for operation have finger contact areas larger than those of the keys situated in a region where the thumb needs to be stretched out.

To be more specific, the keys having the smaller finger contact areas are arranged in the region where the load on the hand or the finger used for operation is light whereas the keys having the larger finger contact areas are arranged in the region where the load is heavy. Accordingly, the load on the hand and the thumb used for operation can be reduced, thereby allowing for comfortable operation.

Moreover, the character input keys for inputting the characters, the numerics, and the symbols which are frequently used during the usage of the personal mobile terminal can be arranged mainly in the region A shown in FIG. 2, that is a region where the thumb is stretched out for operation. Owing to such a key arrangement, in addition to the effect provided by the circumferential input keys 35 being arranged around the same circumference surrounding the direction key 8 and the input enter key 10, the amount of movements made by the thumb in a flow of the character input operation can be small. Therefore, the load on the hand and the thumb used for operation can be reduced and comfortable operation is allowed.

Furthermore, as is the case with the first and second embodiments, the set of the circumferential input keys 35 can be rotated by 180 degrees around the input enter key 10. Thus, when the operator is to hold the personal mobile terminal 30 with the left hand and perform the operation with the thumb of the left hand, the operator rotates the set of the character input keys 35 by 180 degrees from the state in which the operator holds the terminal with the right hand. With this rotation, when the personal mobile terminal 30 is held with the left hand, the same operational feeling as in the case where the personal mobile terminal 30 is held with the right hand can be obtained. More specifically, the keys having the smaller finger contact areas are arranged in the region where the load on the hand or the thumb used for operation is light whereas the keys having the larger finger contact areas are arranged in the region where the load is heavy. Accordingly, the load on the hand and the thumb used for operation can be reduced, thereby allowing for comfortable operation.

As explained so far, in the case of the input device according to the third embodiment of the present invention, each size of the circumferential input keys 35 arranged around the circumference of the direction key 8 and the input enter key 10 is set depending on the amount of load on the thumb, thereby reducing the load on the hand and the thumb used for operation. In addition, the set of the circumferential input keys 35 can be rotated by 180 degrees, so that the same operating feeling can be obtained in both the right-handed and left-handed operations. This accordingly allows for comfortable operation.

Additionally, since the circumferential input keys 35 include almost all the keys required for operating the personal mobile terminal 30, the amount of movements made by the thumb in a flow of the input operation can be small. Therefore, the load on the hand and the thumb used for operation can be reduced and comfortable operation is also allowed.

Fourth Embodiment

Figure 8:
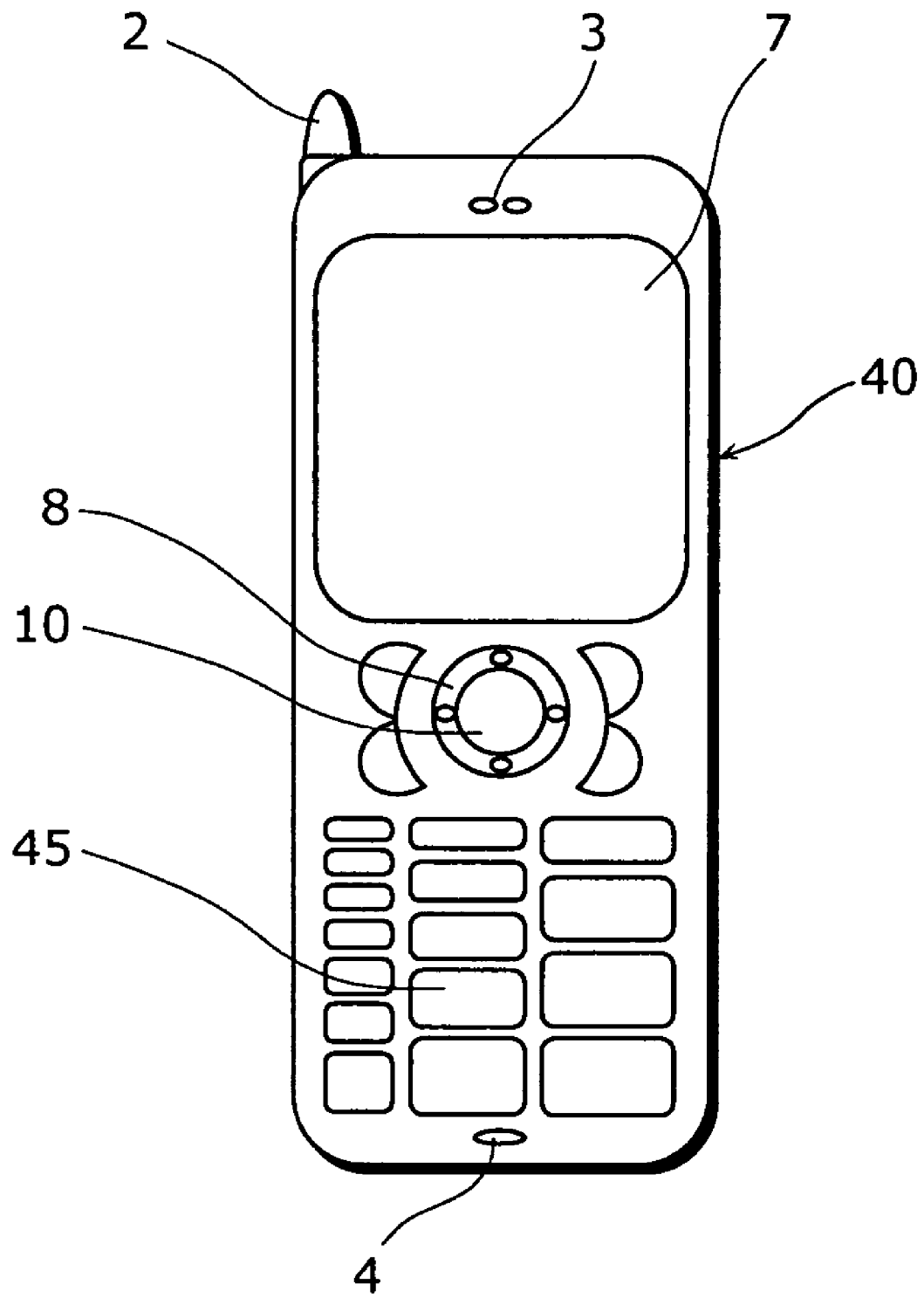
FIG. 8 is a front view of a personal mobile terminal having an input device according to a fourth embodiment of the present invention.
Figure 9:
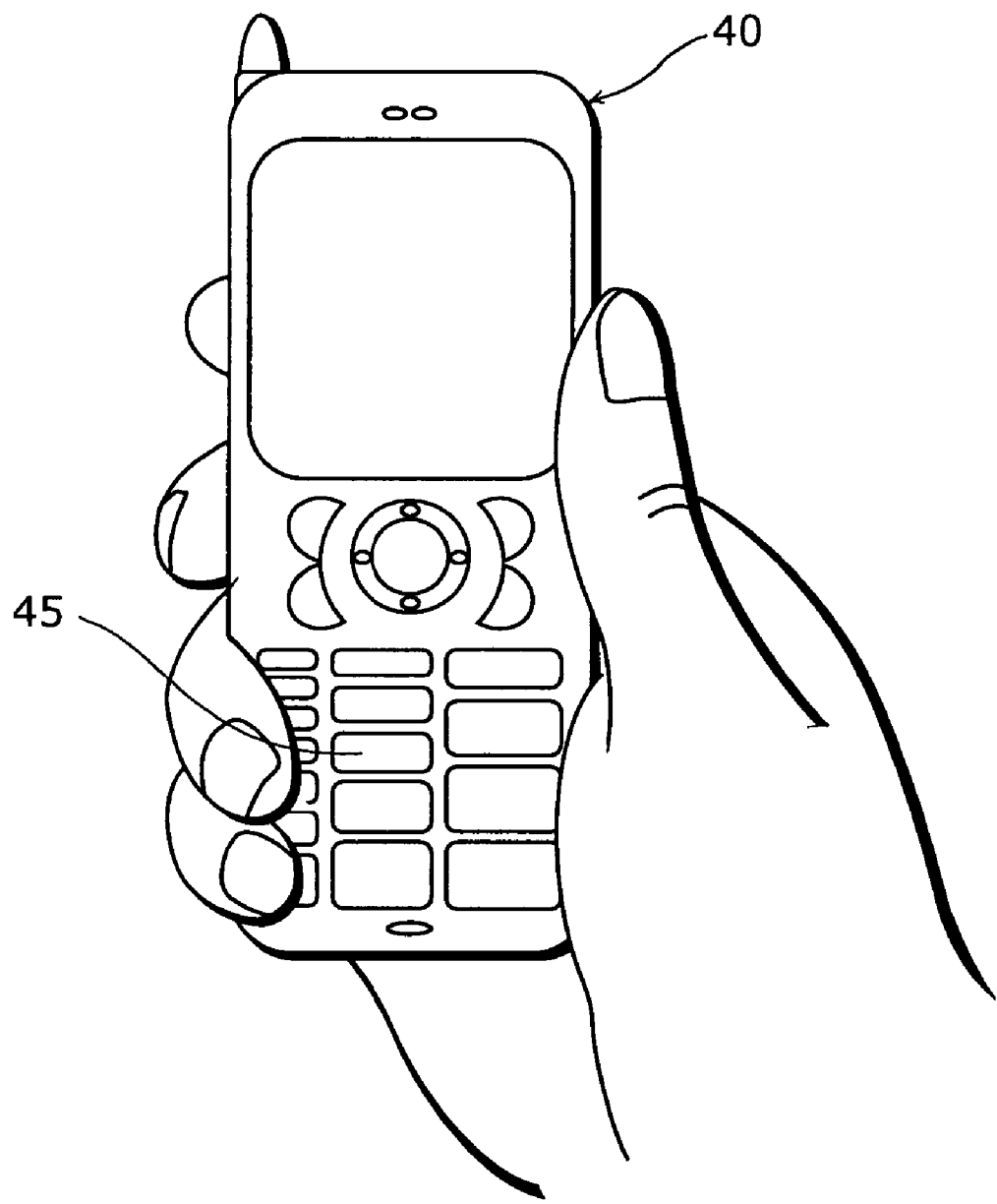
FIG. 9 is a diagram showing a case where the operator is operating the personal mobile terminal having the input device according to the fourth embodiment of the present invention with the right hand.

The fourth embodiment is explained using FIGS. 8 and 9, with an emphasis on differences from the first, second, and third embodiments. It should be noted here that the components which are identical to those in the first, second, and third embodiments are assigned the same reference numerals, and will not be explained.

FIG. 8 is a front view of a personal mobile terminal 40 having an input device according to the fourth embodiment of the present invention.

The input device of the personal mobile terminal 40 is composed of a touch panel which has software input keys 45 including sixteen kinds of software keys for inputting: ten kinds of numeric characters 0 to 9; two kinds of symbols; and six kinds of function keys (such as an outgoing call key, a manner mode key, and a clear key) used during the usage of the personal mobile terminal. In other words, the software input keys 45 arranged on the touch panel are composed of almost all keys required during the usage of the personal mobile terminal. By touching a desired software input key 45 on the touch panel, the operator can input desired information.

As shown in FIG. 9, the software input keys 45 situated on the right side respectively have finger contact areas larger than those of the software input keys 45 situated on the left side. Especially the software input keys 45 situated on the right side in the lateral direction are set to have the largest areas. To be more specific, the input key 45 at the upper left is the minimum in size and the input keys 45 gradually increase in size in the downward direction as seen in the diagram. Also, the input keys 45 gradually increase in size in the rightward direction as seen in the diagram.

FIG. 9 is a diagram showing a case where the operator is operating the personal mobile terminal 40 having the input device according to the fourth embodiment of the present invention with the right hand.

As shown in FIG. 9, out of the software input keys 45, the keys situated in a region where the thumb needs to be flexed when the personal mobile terminal 40 is held with the right hand for the operation have finger contact areas larger than those of the keys situated in a region where the thumb needs to be stretched out.

To be more specific, the keys having the smaller finger contact areas are arranged in the region where the load on the hand or the finger used for operation is light whereas the keys having the larger finger contact areas are arranged in the region where the load is heavy. Accordingly, the load on the hand and the thumb used for operation can be reduced, thereby allowing for comfortable operation.

Moreover, prior to an input operation, the operator can change the arrangement and the sizes of the software input keys 45 on the touch panel by setting which hand the operator is to use, so that the same operating feeling can be obtained in both the right-handed and left-handed operations. This accordingly reduces the load on the hand and the thumb used for operation and also allows for comfortable operation. Here, instead of the operator setting which hand to use for operation, the personal mobile terminal 40 may have an acceleration sensor, a temperature sensor, or a pressure sensor, for example, to detect with which hand the operator is holding the terminal.

As explained so far, in the case of the input device according to the fourth embodiment of the present invention, each size of the software input keys 45 arranged on the touch panel is set depending on the amount of load on the thumb, thereby reducing the load on the hand and the thumb used for operation. In addition, the operator or the personal mobile terminal 40 can set the device according to the right or left hand with which the operator is to hold the terminal, so that the same operating feeling can be obtained in both the right-handed and left-handed operations. This accordingly allows for comfortable operation.

Fifth Embodiment

Figure 10:
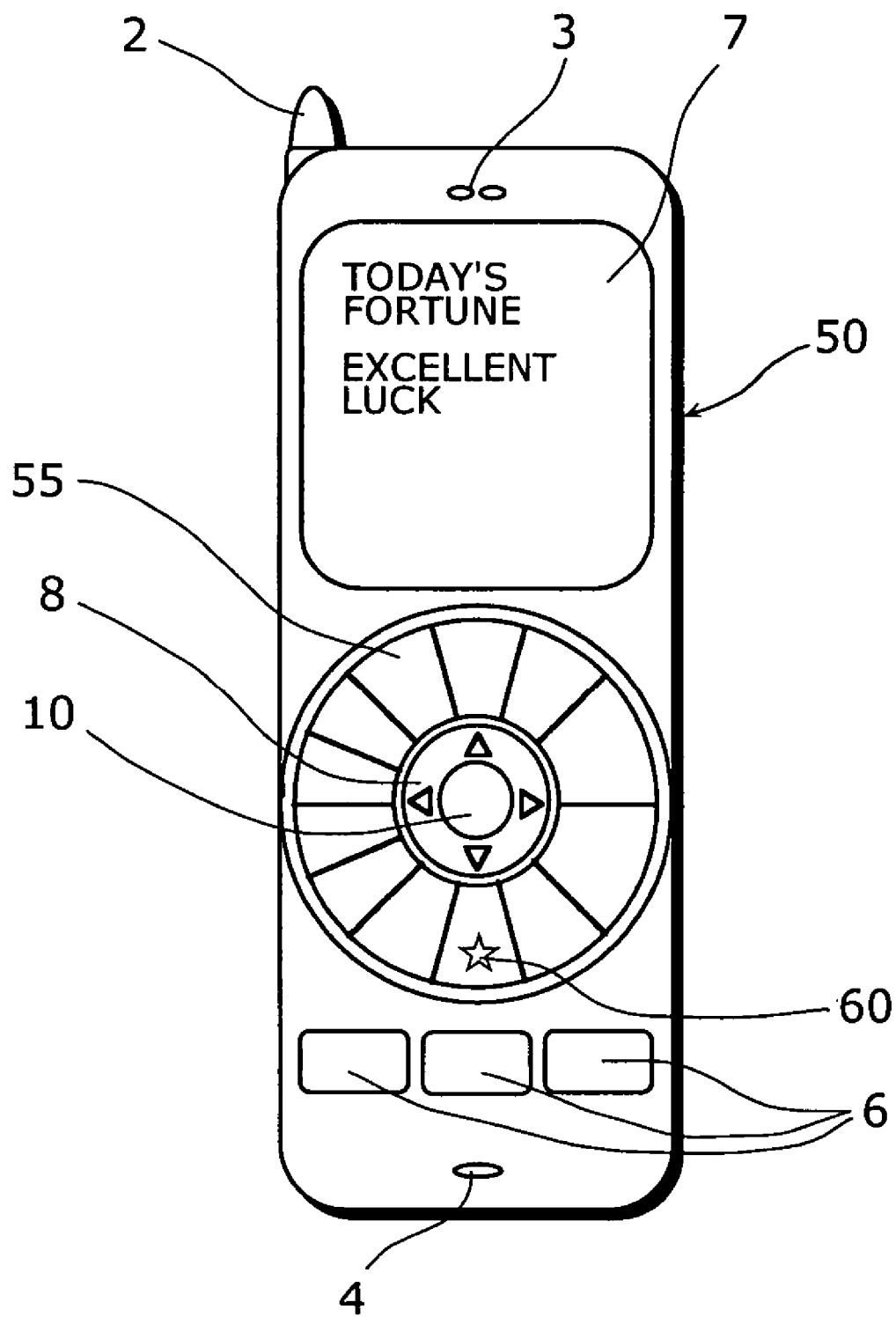
FIG. 10 is an external view of a personal mobile terminal 50 having an input device according to a fifth embodiment of the present invention.

The fifth embodiment is explained using FIG. 10. It should be noted here that the components which are identical to those in the first, second, third, and fourth embodiments are assigned the same reference numerals, and will not be explained.

FIG. 10 is a front view of a personal mobile terminal 50 having an input device according to the fifth embodiment of the present invention.

The personal mobile terminal 50 is provided with functions for making a phone call, receiving/sending an email, and connecting to the Internet. These functions are not the prime features of the present invention, so will not be explained in the present specification.

The input device provided for the personal mobile terminal 50 has twelve kinds of character input keys 55 as circumferential input keys for inputting ten kinds of numerics 0 to 9 and two kinds of symbols.

Each of the circumferential input keys 40 has a light-emitting diode 60 as a light-emitting means. At a first press of the input enter key 10 after the personal mobile terminal is set to a fortune-telling mode, each of the light-emitting diodes turns on and off repeatedly in a rhythmic manner so that the diodes illuminate sequentially in a clockwise direction like a roulette wheel. In other words, always only one of the twelve keys illuminates at time. Then, at a second press of the input enter key 10, the speed of pseudo-rotation created by the illumination of the light-emitting diodes gradually decreases. In the end, only one of the light-emitting diodes 60 that corresponds to one of the circumferential input keys 55 illuminates. After a lapse of a predetermined period of time, this light-emitting diode 60 which is currently illuminating turns off as well. In accordance with the key at which the pseudo-rotation last stopped, the display unit 7 displays a corresponding fortune. In such a way, a fortune-telling game can be realized.

As described so far, the input device according to the fifth embodiment of the present invention takes advantage of the circumferential input keys arranged on the same circumference to realize an enjoyable game using the illumination and extinction of the light-emitting diodes provided for the circumferential input keys 55.

It should be noted here that although the selected key is indicated by the illumination of the light-emitting diode in the fifth embodiment, the present invention is not particularly limited to this. A different means can be employed as long as it can identify the selected key out of the plurality of keys.

Moreover, although the light-emitting diodes illuminate sequentially in the clockwise direction, the present invention is not particularly limited to this. For example, the diodes may illuminate in sequence in a counterclockwise direction or in the order according to a random numbers table.

Furthermore, although the illumination of the light-emitting diodes is associated with the fortune-telling game, the present invention is not particularly limited to this. A different game, such as a roulette game, can be applied as long as one out of a plurality of alternatives can be selected in association with the illumination of the light-emitting diodes.

The preferred embodiments of the present invention have been described so far. It should be noted here that an apparatus having the input device of the present invention is not limited to the personal mobile terminal. For example, a remote control used for operating a television and an audio system may have the input device of the present invention.

In the above embodiments, the circumferential input keys include the character keys, the numeric keys, the symbol keys, and the terminal function call keys. However, the circumferential input keys may have a different configuration. For example, the keys may be used for calling functions, such as play, stop, pause, and fast-forward. Alternatively, the character input unit may be so constructed that the character keys, the symbol keys, the numeric keys, and the functions keys are arranged in the order of frequency of use.

Figure 11:
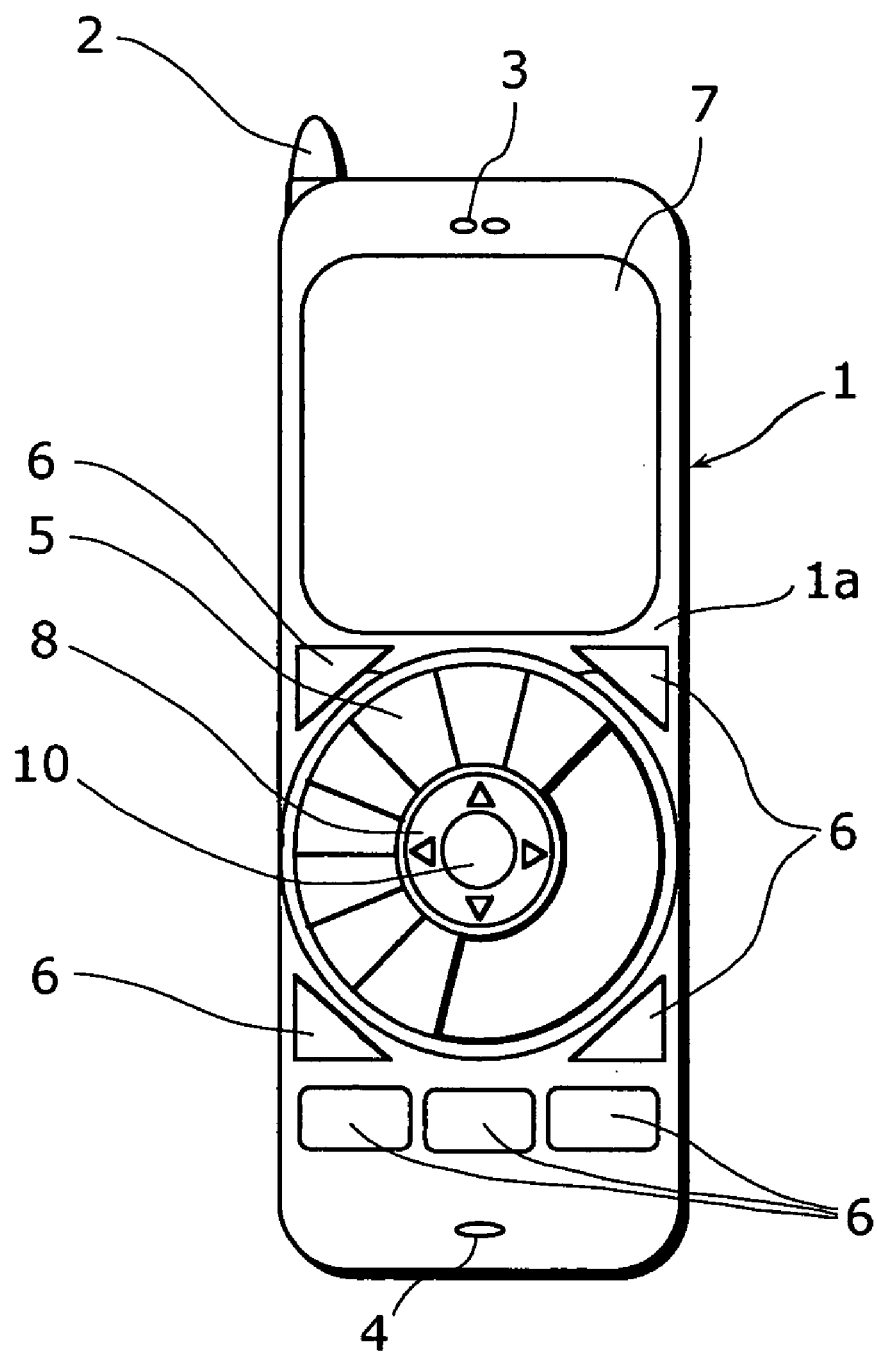
FIG. 11 is a plan view showing a case where circumferential input keys are arranged on a part of a circumference.
Figure 12:
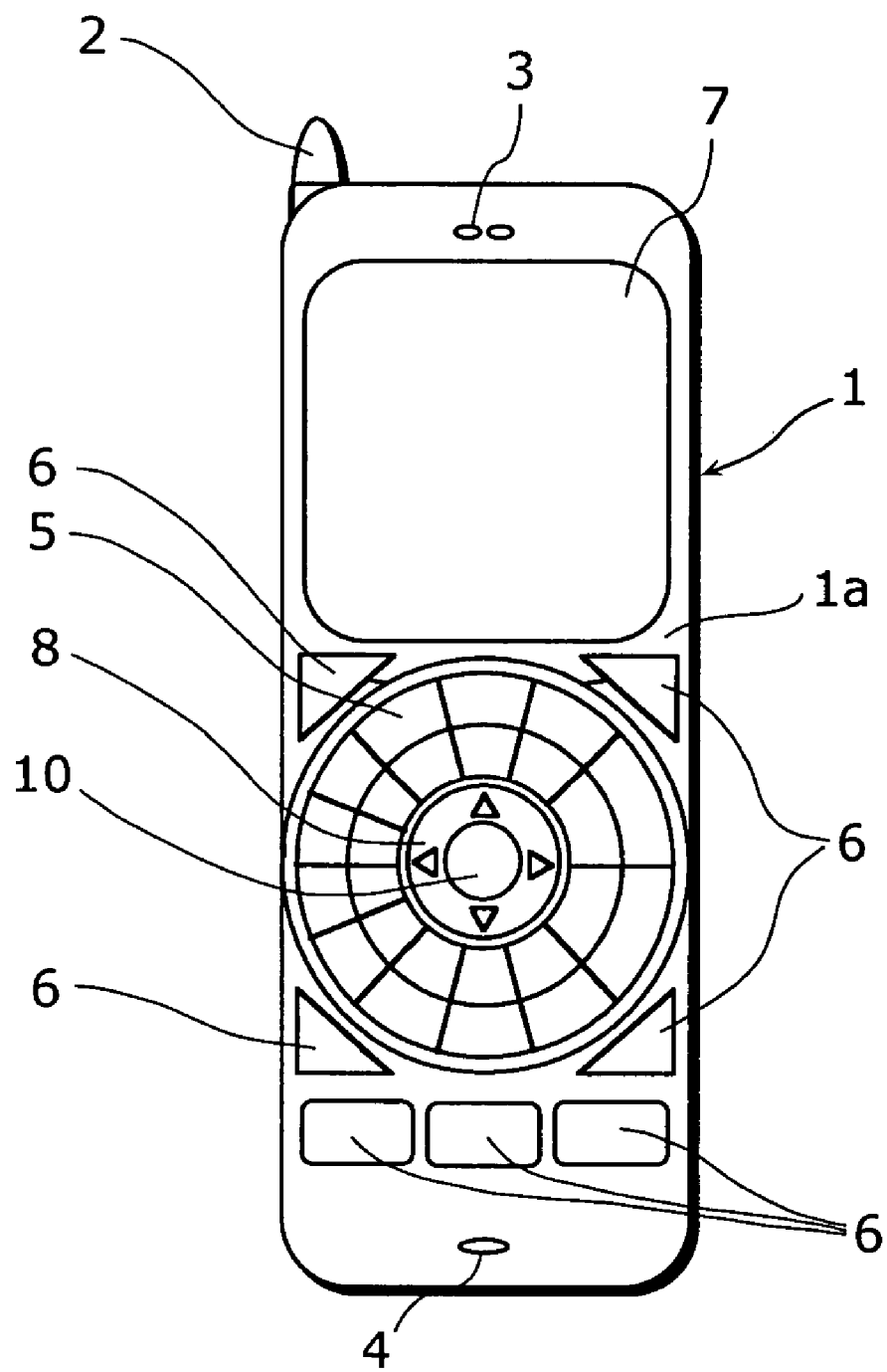
FIG. 12 is a plan view showing a case where circumferential input keys are arranged on a plurality of circumferences.
Figure 13:
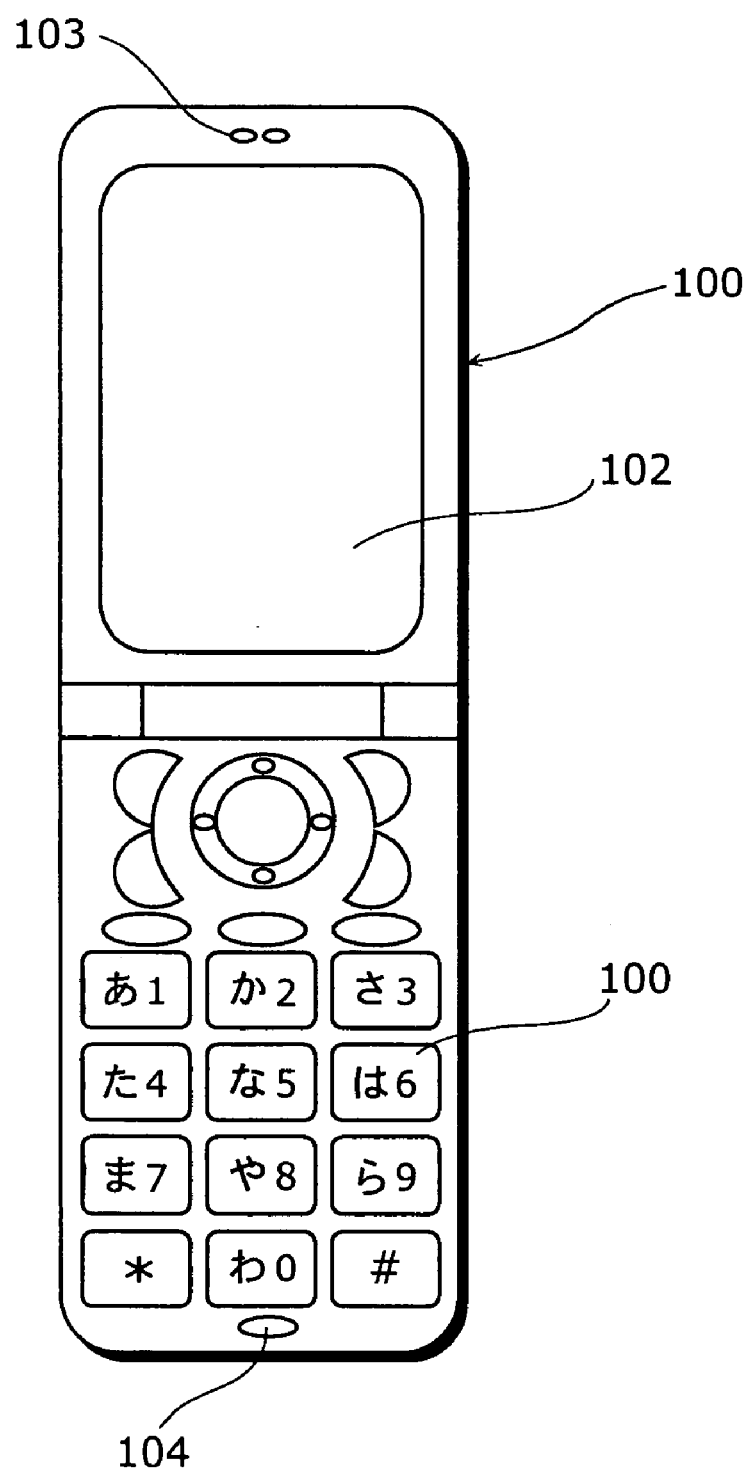
FIG. 13 is a schematic view of a conventional input device.
Figure 14:
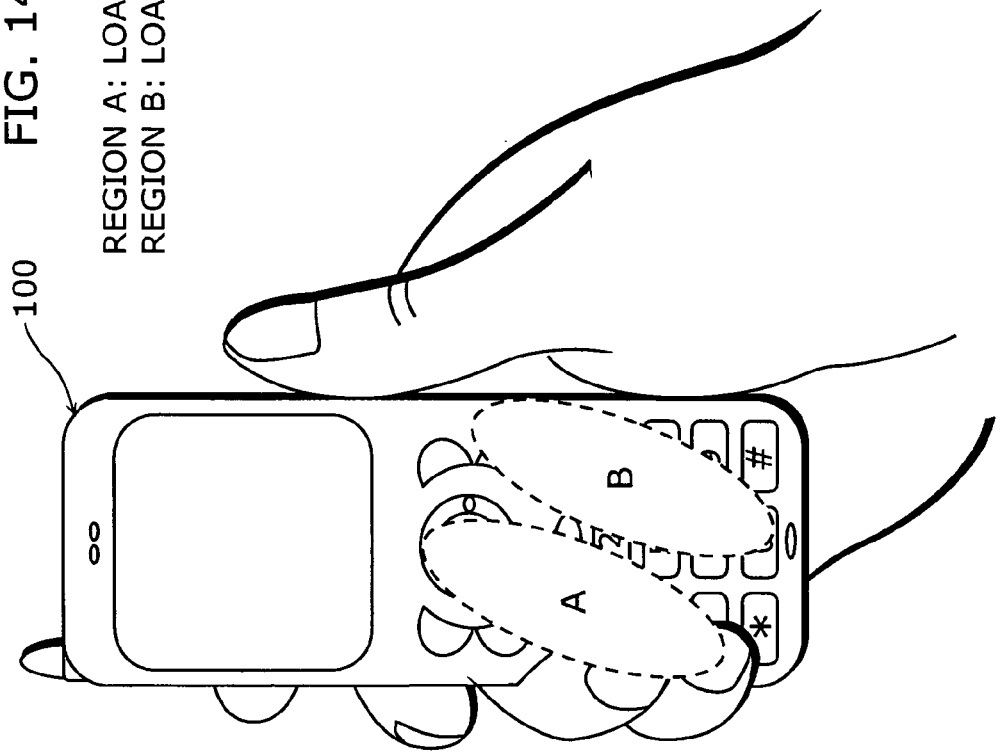
FIG. 14 is a diagram for explaining a load put on a thumb during operation of a conventional personal mobile terminal.
Figure 15:
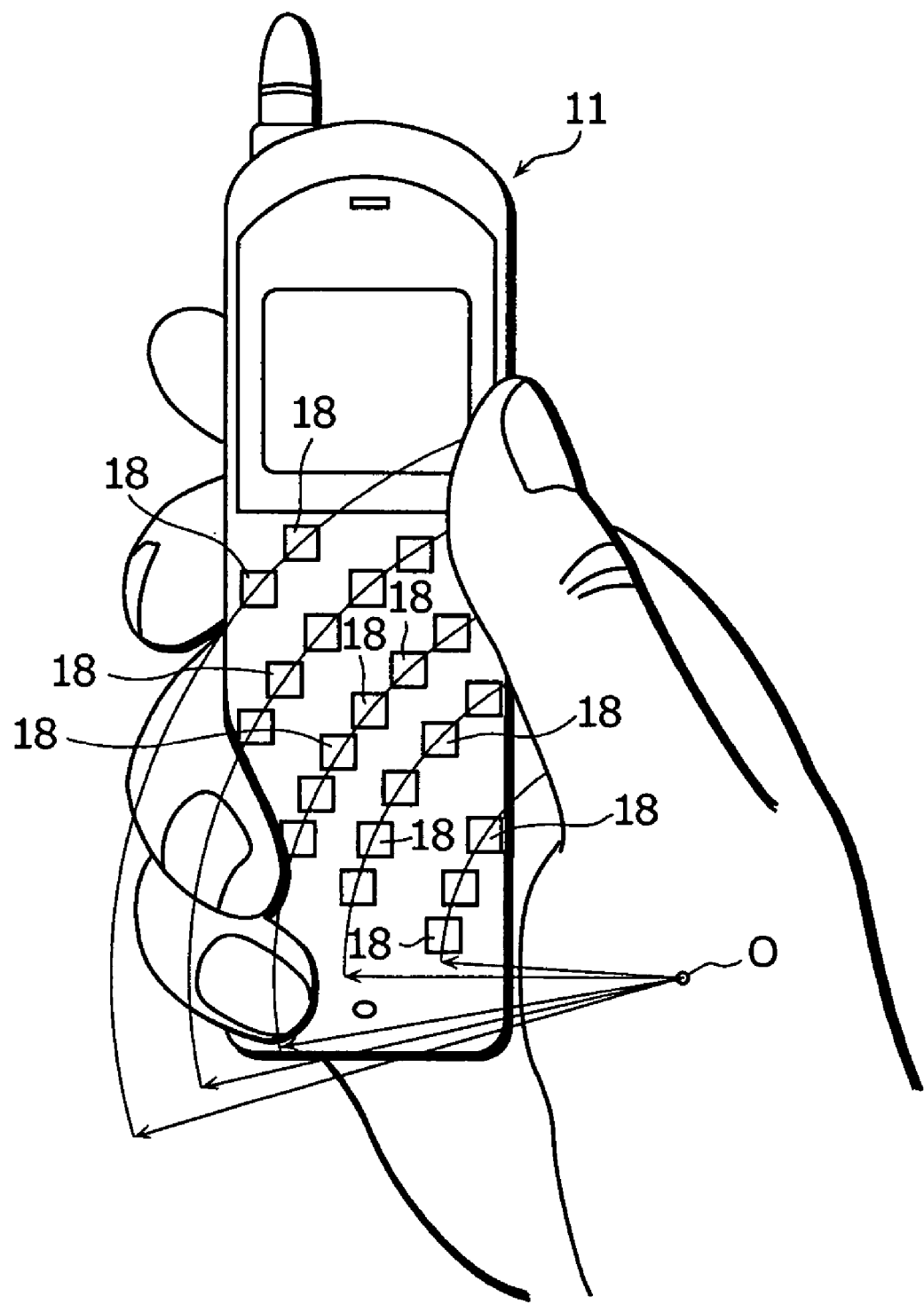
FIG. 15 is an external view of a conventional personal mobile terminal described in JP 2002-164980.
Figure 16:
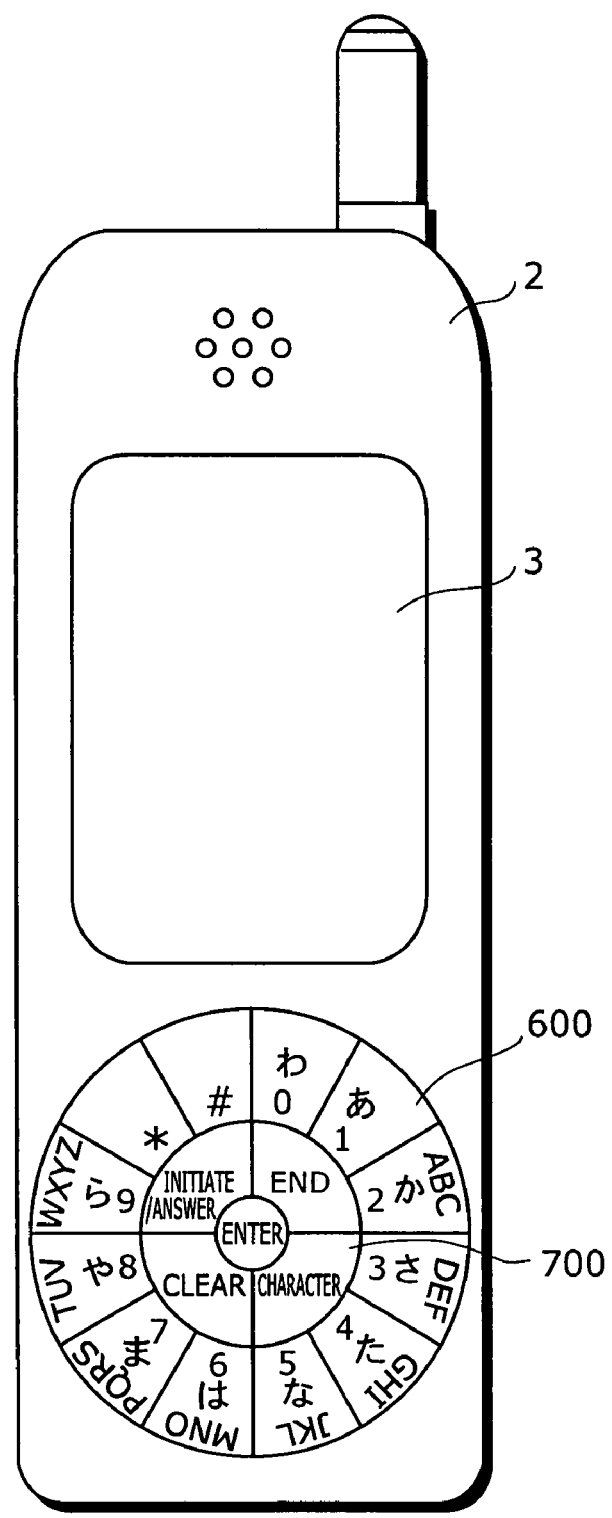
FIG. 16 is an external view of a conventional mobile input operation unit described in JP 2001-296953.

The arrangement of the circumferential input keys is not limited to the case where the keys are arranged entirely around the same circumference. As shown in FIG. 11, the circumferential input keys may be arranged around a part of the circumference. Alternatively, as shown in FIG. 12, the circumferential input keys may be arranged around a plurality of circumferences having the same center.

Each personal mobile terminal described in the above embodiments is provided with functions for making a phone call, receiving/sending an email, and connecting to the Internet. The functions are not limited to these. It should be understood that other functions (a television function and a camera function, for example) may be provided.

In the above embodiments, the numbers of kinds of the circumferential input keys are twelve, fifteen, and twenty. However, the present invention does not limit the number of keys. For example, the keys are made up of ten numeric keys used for inputting the numeric characters 0 to 9.

Moreover, the angle of rotation of the character input keys is 180 degrees according to the first embodiment. However, the angle of rotation is not particularly limited, and the set of the keys may freely rotate. Or, the angle of rotation may be a different angle, such as 30, 60, 90, 120, or 150 degrees. Also, the angle of rotation may be freely selected from among the plurality of angles through intermittent control by repeating the engagement and the disengagement.

Furthermore, the input selection unit of the first embodiment allows for a free selection among four directions: right, left, up, and down. However, the number of selectable directions is not particularly limited. For example, a selection may be made out of eight directions.

Also, the circumferential input keys may be realized by software keys made up of a display screen and a touch panel. In this case, pseudo keys displayed on the display screen may be virtually rotated, or only the states before and after the rotation may be displayed.

Moreover, although the input device of the present invention has a profound effect when used as an input unit of a personal mobile terminal mainly, the present invention is not limited to the personal mobile terminal. It is obvious that the input device is also applicable to a device, such as a game machine and a remote control used for operating an apparatus, that is held with one hand and operated with a finger of that hand.

The input device related to the present invention has a feature of reducing a load on a hand and a finger used for operation, and is useful as input keys and the like of a personal mobile terminal. The input device is applicable to a remote control used for operating an apparatus and to a game machine as well.

The invention claimed is:

1. An input device provided for a communication apparatus which is held with a hand of a person, said input device comprising a plurality of character input keys for inputting characters, numerics, or symbols, and which are operated with a finger of the hand holding said apparatus, wherein in a case where said apparatus having said input device is held with the hand, a finger contact area of each of said character input keys gradually becomes smaller in a direction away from a base of the finger, so that larger keys are located on a side of the input device closest to the base of the finger, medium-sized keys are located on a middle portion of the input device, and smaller keys are located on a side of the input device farthest from the base of the finger.

2. The input device according to claim 1, wherein the finger is a thumb.

3. The input device according to claim 1, wherein said character input keys include a plurality of circumferential character input keys arranged around a circumference having a center on said input device.

4. The input device according to claim 3, wherein a set of said circumferential character input keys is operable to (i) rotate as a whole about the center of the circumference, as an axis of rotation, around which said circumferential character input keys are arranged, and (ii) stop at a predetermined angle.

5. The input device according to claim 3, wherein the predetermined angle is 180 degrees.

6. The input device according to claim 3, further comprising a plurality of direction keys for selecting a direction, said direction keys being situated within the circumference, around which said circumferential character input keys are arranged.

7. The input device according to claim 1, further comprising a light-emitting unit, provided for each of said circumferential character input keys at each corresponding position, operable to illuminate and darken, wherein the illumination of said light-emitting units are controlled in accordance with a predetermined rule.

8. A personal mobile terminal having said input device according to claim 1.

9. The input device according to claim 1, wherein said apparatus is held with the right hand.

10. The input device according to claim 1, wherein the finger contact areas of said character input keys decrease in a lateral direction of the input device.

* * * * *